(12) United States Patent
Keil et al.

(10) Patent No.: US 6,215,918 B1
(45) Date of Patent: Apr. 10, 2001

(54) THERMO-OPTICAL SWITCH

(75) Inventors: Norbert Keil; Huihai Yao; Crispin Zawadzki; Hans-Peter Nolting, all of Berlin (DE)

(73) Assignee: Heinrich-Hertz-Institut fuer Nachrichtentechnik Berlin GmbH., Berlin (DE)

(*) Notice: Subject to any disclaimer, the term of this patent is extended or adjusted under 35 U.S.C. 154(b) by 0 days.

(21) Appl. No.: 09/091,581
(22) PCT Filed: Dec. 13, 1996
(86) PCT No.: PCT/DE96/02466
  § 371 Date: Jun. 19, 1998
  § 102(e) Date: Jun. 19, 1998
(87) PCT Pub. No.: WO97/22907
  PCT Pub. Date: Jun. 26, 1997

(30) Foreign Application Priority Data

Dec. 19, 1995 (DE) .............................. 195 49 245

(51) Int. Cl.⁷ .................................................. G02B 6/35
(52) U.S. Cl. ...................................... 385/16; 385/9; 385/40
(58) Field of Search .................................. 385/2, 3, 8–10, 385/15–23, 40–42

(56) References Cited

U.S. PATENT DOCUMENTS

| | | | |
|---|---|---|---|
| 4,753,505 | * 6/1988 | Mikami et al. ..................... | 385/16 X |
| 4,943,133 | * 7/1990 | Deri et al. ............................ | 385/3 |
| 5,058,972 | * 10/1991 | Erman et al. ....................... | 385/17 |
| 5,066,086 | * 11/1991 | Angenent et al. .................. | 385/41 |
| 5,146,518 | * 9/1992 | Mak et al. ........................... | 385/41 |
| 5,148,505 | * 9/1992 | Yanagawa et al. .................. | 385/16 |
| 5,173,956 | * 12/1992 | Hayes .................................. | 385/16 |
| 5,321,782 | * 6/1994 | Mugino et al. ..................... | 385/41 |

FOREIGN PATENT DOCUMENTS 62-297827 * 12/1987 (JP) .

OTHER PUBLICATIONS

Keil et al, "Polymer thermo–optic switching matrix for space–routing in transparent OFDM networks", Proceedings of the SPIE, vol. 2449, Jan. 1, 1995, pp. 281–292.*

* cited by examiner

*Primary Examiner*—John D. Lee
(74) *Attorney, Agent, or Firm*—Karl Hormann

(57) ABSTRACT

For reducing power consumption and cross-talk in the transmission of broadband optical signals without prior conversion into electrical signals there are provided in a thermo-optical switch two waveguides (WL1 and WL2) extending closely adjacent each other over their interactive length the width of which is at least partially covered by one or two pairs of lamellate electrode arms of a heating electrode (E), the arms of each pair being interconnected by a common web (G) and being of similar geometric shape as the waveguides (WL1 and WL2) positioned below them. Furthermore, means is provided for changing and/or setting the thermal and/or geometric symmetry/asymmetry of the refractive indices in the two waveguides.

20 Claims, 10 Drawing Sheets

THERMO-OPTICAL SWITCH

BACKGROUND OF THE INVENTION

1. Field of the Invention

The invention relates to a thermo-optical switch having a layer structure on a substrate and containing, in a waveguide layer, a directional coupler waveguide structure and, above the waveguide layer, a heating electrode configured to complement the form of the coupler structure.

For the transmission of broadband optical signals without prior conversion into electrical signals, it is necessary to utilize cross-connects which may be switched to a state of optical transparency. Such optically transparent switches contain, among others, spatial switches for directing incoming optical signals to selected output fibers. The spatial switches must satisfy the following requirements: low crosstalk, low coupling attenuation, independence of signal polarization, low electric switching power, response times <10 ms. high integration density, low production costs.

2. The Prior Art

In recent years, thermo-optical switches have been developed on a polymer basis because the properties of polymeric waveguides give rise to the expectation that the above-mentioned requirements may be realized with them by way of selective structuring. Thus, polymers have a large thermo-optical coefficient, i.e. a change in temperature causes a large change of their refractive index, combined with low thermal conductivity. These properties result in low switching power for a thermo-optical switch which is below that of a comparable $SiO_2$ switch by a factor of about 100. Since polymers display very low birefringence they can be used for the fabrication of components which are independent of polarization. Switching times are in the range of milliseconds, 1 to 10 ms being typical.

Moreover, the use of polymer waveguides makes it possible to fabricate spatial switches by relatively simple processes which are well-known from the fabrication of microelectronic components. In addition, polymer technology makes it possible to integrate on a single substrate, as hybrid technology, a plurality of optical components, such as, for instance, III-V-lasers, photo diodes with polymer waveguides, networks and switches. Thus, components with complex functions may be fabricated in a cost-efficient manner.

Proceeding from the above-mentioned state of knowledge, solutions have been sought in recent years, to utilize as many of the above-mentioned advantages of polymers for optical elements as possible. Since the necessary switching power and switching time of thermo-optical elements are primarily dependent upon their thermal properties, i.e., their thermal conductivity, thermo-optical coefficient and the heat capacity of waveguide layer, buffer layers and substrate material, as well as upon the shape and size (dimensioning) of the waveguides and heating electrode, there are known in the art many thermo-optical elements differing in their concrete structure for optimally realizing defined functions.

In Journal of Lightwave Technology, Vol. 7, No. 3 (1989), pp. 449–453, there is described a planar thermo-optical switch in which a polymeric waveguide layer made of polyurethane is arranged upon a PMMA (polymethyl methacrylate) substrate, with a PMMA buffer layer superimposed thereon on which is provided a silver strip conducting electrode as a heating element. At a switching power of 100 mW, typical switching times are 12 ms for on-off switching and 60 ms for off-on switching.

In most thermo-optical switches based on polymer, the waveguides are formed in strips which leads to reduced switching times and switching power. Thus, a digital optical switch (DOS) which is independent of polarization is described in SPIE, Vol. 1560, Nonlinear Optical Properties of Organic Materials IV (1991), pp. 426–433 in which a gold strip electrode is provided on one of the two output branches of a symmetrically structured Y-junction. When a heating voltage is applied to the electrode it realizes an asymmetric effect upon the described switch. The change of the refractive index of the amorphous polymeric material of the waveguide is generally isotropic and, therefore, independent of any polarization as regards light propagating through the structure. The monomodal waveguide made of DANS polymer arranged upon a glass substrate was fabricated by photo bleaching the non-waveguiding areas of the waveguide layer with UV irradiation and is covered by a buffer layer. The switching times of this arrangement are in the millisecond range.

In Proc. 21st Eur. Conf. on Opt. Comm. (ECOC '95—Brussels), pp. 1063–1066, there is also described a Y-shaped waveguide in a polymer-based digital optical switch. In this case the waveguide structure has been realized by photo lithography followed by dry-etching of moats in a silicon substrate, followed by thermal oxidation in water vapor and, thus, creation of a $SiO_2$ buffer layer, spinning of CYCLOTENE® polymer thereon and covering the polymer layer by a further $SiO_2$ buffer layer. A titanium thin film electrode is divided and positioned above the two output branches. At a switching power of between 130 mW and 230 mW the extinction coefficient in the heated branch is better than 20 dB. The optical power is then fed wholly through the other—unheated—branch. But even in this technical solution the requisite switching power and switching times are still too high.

In European Patent EP 0,642,052 there is described a polymer-based digital optical switch in a layer structure consisting of a substrate, lower buffer layer, waveguide layer, upper buffer layer and heating element with a Y-shaped waveguide structure, wherein the refractive indices of the two buffer layers are lower than the refractive index of the waveguide layer. Moreover, the refractive index of the buffer layer adjacent to the heating element is lower than that of the lower buffer layer. Ranges covering the contrast of the refractive indices have been disclosed in accordance with parameters desired (optical loss, switching power) for realizing a predetermined function, and the dimensions of the output branches of the waveguide are structured symmetrically or asymmetrically, and the heating elements are also arranged symmetrically (at both output branches) or asymmetrically (at one output branch only). While precise current control is not required for the described arrangement it requires a higher switching power and leads to cross-talk of not more than about −20 dB.

Low switching power is required in a thermo-optical switch described in IEEE Photonics Technology Letters, Vol. 5, July 1993, pp. 782–784. The switch is provided with a Mach-Zehnder-interferometer above the two waveguides of which there are arranged thin-film heating elements. While this optical switch does realize low cross-talk as well, its overall length is about thrice that of a conventional directional coupler.

In connection with a different system of waveguide material there is described in Electronics Letters, Oct. 29, 1981, Vol. 17, No. 22, pp. 842–843, a thermo-optically induced waveguide based upon $LiNbO_3$:Ti in which a nickel-chromium electrode is arranged on one section of the waveguide. When a voltage is applied to the electrode the refractive index of the area of the waveguide below the electrode changes thus deflecting the fed-in light.

Also, directional coupler switches with alternating Δβ are known, as described, for instance, in IEEE Journal of Quantum Electronics, Vol. QE-12, No. 7, pp. 396–401, July 1976. In this case, several electrode sections are arranged upon parallel waveguides made from the previously mentioned LiNbO$_3$ material. In actual switching conditions the electrodes generate in the corresponding waveguide sections below them, based upon the electro-optical effect, a difference in the propagation velocities of the light of respective alternating signs. If the interactive length between the two waveguides is greater than the coupling length the desired switching state (cross-over or throughput state) may be set by way of the switching power.

A directional coupler with alternating Δβ is also described in Patent Abstracts of Japan, Vol. 12, No. 192 (P-712), Jun. 4, 1988 #JP 62.297,827 (Fujitsu Ltd.), in which in a first variant several (here two) electrode sections are arranged congruently over each of two parallel waveguides, and in a second variant the electrode configuration is structured in a step-like manner whereby each of the horizontal electrode sections covers about half of the coupling length of the waveguides and wherein the areas of the waveguides covered by the electrode sections are displaced relative to each other. With such a directional coupler it is possible, proceeding from a cross-over state which for technical reasons is bad in terms of realizing a cross-over/throughput switching function, only to switch in the throughput direction (symmetric switch).

In connection with testing and calculating the coupling properties of directional couplers formed by strips of a dielectric material on a LiNbO$_3$ substrate and metal films between those strips, there are described in APPLIED OPTICS, Vol. 17, No. 5, Mar. 1, 1978, pp. 769–773 different possibilities of the placement of the two waveguides in which the coupling coefficient is never constant.

The state of the art upon which the invention is based is described in several publications all of which describe the same subject: OFC '95, Postdeadline Papers, PD 17-1, 1995; MICRO SYSTEM Technologies '94, 4th Int. Conf. on Micro, Electro, Opto, Mechanical Systems and Components, Berlin, Oct. 19–21, 1994, VDE-Verlag GmbH., pp. 1097–1100; Jahresbericht 1994 des Heinrich-Hertz-Instituts für Nachrichtentechnik Berlin GmbH., pp. 54–55; SPIE Proceedings Series Vol. 2449, 1994, pp. 281–292 may be mentioned. In the last-mentioned publications there is described a thermo-optical tuneable (4×4) switching field fabricated in polymer technology in an integrated optical form, the basic element of which is a controlled thermo-optical switch of the kind mentioned above, structured as a 2×2 directional coupler.

This 2×2 directional coupler is provided with two symmetrically arranged waveguides the center portions of which are spaced closely to each other so that under controlled conditions there will be cross-talk of light from one waveguide into the other one. When a voltage is applied to it, the electrode which is positioned over one waveguide only will heat this waveguide somewhat so that its refractive index changes affecting a transfer of light from one of the waveguides into the other one. The heat generated in the heating electrode diffuses through the upper buffer layer, the waveguide layer and the lower buffer layer into the silicon substrate which acts as a heat sink. Owing to the negative temperature coefficient of the waveguide, this leads to a change of the refractive index in the waveguide and of the propagation coefficient of the waveguide. As has already been mentioned, the effect of the thermo-optically induced phase shift in waveguides is used for switching in Mach-Zehnder or directional coupling structures. The asymmetric coupler is very short and consumes little power. The extinction ratio in the initial cross-over state is set by the selection of an appropriate coupling length; a subsequent adjustment is not possible. Process-conditioned fabrication tolerances limit the extinction ratio in the cross-over state to typically −25 dB which results in minimal cross-talk of only −21.5 dB in the 4×4 matrix. In different coupling elements with an electrode length of 3 mm extinction ratios were measured between 20 dB (cross) and 32 dB (straight), at a power consumption of 30 to 40 mW. The switching times were stated to be less than 1 ms. The coupler is structured to be in its cross-over state when the electrode is not heated, i.e. light coupled into one of the input gates is coupled from the input waveguide into the parallel adjacent waveguide and exits at the output thereof. When the electrode is heated, the light exits at the output gate of the same waveguide ("bar").

The described switching arrangements are processed under dust-free conditions. To this end, a silicon substrate, which also serves as a heat sink, is covered with an SiO$_2$ passivation layer by thermal oxidation. Thereafter, the PMMA waveguide layer and a further passivation layer made of Teflon® are applied in succession by a spin process. The PMMA is doped with a photo initiator molecule in which a photochemical process is released (light induced photo locking) under intense exposure to UV radiation, which leads to an increase of the refractive index of the waveguide layer. The integrated optical light waveguides of a width of a few pm are defined by localized UV exposure through a photo mask. The refractive index and the difference in refractive indices between the exposed and unexposed areas may be set very precisely over a wide range by selecting appropriate mixture ratios of photo initiator and PMMA and by varying the dose of exposure. In a subsequent process step the remaining photo initiator molecules are removed from the unexposed areas of the waveguide layer by heating, and the waveguide structures will thus be fixed. As a final step, an aluminum-gold layer is vapor deposited, from which the micro heating electrodes are etched by wet chemical action.

Aside from the electrode configuration which is asymmetric relative to the optical axis described in respect of an actual switch, a symmetric electrode configuration has also been mentioned in which a unitary strip-shaped heating electrode is arranged symmetrically relative to the optical axis of the directional coupler. Hence, both waveguides are affected identically by the heating electrode so that simultaneous coupling may occur between the overlapping modal ends. Therefore, a transfer of 100% of the optical power from one waveguide into the other one of the symmetric waveguide configuration and, accordingly, a high extinction ratio may in principle be achieved. However, the switching power required for operating the symmetrical switch is too high (for polymer waveguides several hundred mW per switch), so that they have not been used in practice. Even the last-mentioned arrangements suffer from excessive power consumption and cross-talk.

OBJECT OF THE INVENTION

Therefore, it is an object of the invention to provide a thermo-optical switch the power consumption and cross-talk of which are lower than in prior art devices and the fabrication of which is no more complex than that of known thermo-optical switches.

SUMMARY OF THE INVENTION

In the accomplishment of this object, there is provided a thermo-optical switch of the kind mentioned above in which two waveguides disposed closely adjacent each other along their interactive lengths are covered across at least some of their width by at least one pair of lamellate electrode arms of a heating electrode connected to each other by a common web, the electrode arms being of similar geometric shape as the waveguides positioned below them, and by means for electrically energizing at least one electrode arm of an electrode arm pair, and by further means for changing and/or setting the thermal and/or geometric symmetry/asymmetry of the refractive indices in the two waveguides which extend closely adjacent each other over their interactive length.

The object is accomplished, in an alternative embodiment, by the fact that in a thermo-optical switch of the kind referred to above, two waveguides extending closely adjacent each other along their interactive length are covered over at least part of their width by two pairs of lamellate electrode arms each pair of which is connected by a common web, whereby the two webs are thermally and electrically insulated from each other and arranged symmetrically to each other, the electrode arms being of a similar geometric form as the waveguides positioned below them, that means are provided for electrically energizing at least one electrode arm of an electrode arm pair, and that further means is provided for changing and/or setting the thermal and/or geometric symmetry/asymmetry of the refractive indices in the two waveguides extending closely adjacent each other over their interactive length.

It has been found that the geometric as well as the material-specific asymmetry of the switch in accordance with the invention relative to its optical axis exert a profound influence upon its switching action.

For that reason, there are provided embodiments for influencing the symmetry/asymmetry of the optical switch in a particular manner.

Thus, for influencing the switching action the electrode arms of an electrode arm pair may be arranged in a displaced manner or the inner margins of the electrode arms of an electrode arm pair may be arranged congruently relative to the inner margins of the waveguides positioned below them.

In another embodiment the waveguides which extend closely adjacent each other along their interactive length are disposed in parallel relationship.

In further embodiments, a pair of lamillate electrode arms is connected by a common web (U-shaped) and means are provided for electrically energizing at least one or both electrode arms of an electrode arm pair, whereby in the case of two arms one of them may be energized by a constant bias voltage or, alternatively, only one electrode arm is electrically energized, or two pairs of lamellate electrode arms are arranged symmetrically relative to a common web (H-shaped) and one electrode arm of each electrode arm pair is simultaneously electrically energized with the mirror-symmetrically arranged electrode arm of the other electrode arm pair in order to influence the thermal symmetry/asymmetry.

While compared to the energization of a single electrode arm twice as many energizing sources and higher switching power are required for the simultaneous energization of both electrode arms where a pair of lamillate electrode arms is connected by a common web, because the bias voltage applied to the other electrode arm must first be compensated before the same effect can be achieved as when only one electrode arm is energized, it enhances the flexibility in the design of the solution in accordance with the invention.

When a low voltage is applied to one arm of the heating electrode the symmetric behavior of the coupler in accordance with the invention dominates; because of the high thermal conductivity in the split metal electrode the heat is transferred from the energized electrode arm to the non-energized arm of the split electrode.

In order further to improve this symmetric action, an electrode arm—as has already been mentioned—, in addition to the small vertical displacement of the electrode arms relative to the waveguides occurring during fabrication of the multi-layer structure, is selectively displaced by a small distance relative to the waveguide below it, i.e. asymmetrically relative to the optical axis of the switch in accordance with the invention.

It has been found that this non-congruent alignment of the electrode arms relative to the two waveguides constitutes the dominant asymmetry. Further ways of attaining asymmetry in the switch structure relative to its optical axis have already been mentioned and will be explained hereinafter.

If the initial operating point of such a switch in accordance with the invention is disposed close to the cross-over state only low heating power is required to attain the cross-over state: The rise in the temperature in both arms of the split electrode is very small as is the difference in temperature between the two electrode arms. This may be ascribed to the great thermal conductivity of the metal electrode. If a voltage is applied to the electrode arm which because of its displacement relative to the waveguide does not fully cover the waveguide, the temperature in this arm will be slightly higher than in the non-energized arm. However, because of the more favorable geometric position of the other, i.e. the non-energized, electrode arm relative to the waveguide below it, the rise in temperature is the same in both waveguides so that the velocity of light propagation is also the same in both waveguides. This, of course, is in conformity with the action of the symmetric directional coupler. The more the heat is increased the more prominent is the function of the directional coupler as an asymmetric one. This is so because of the increasing temperature difference between the energized and the non-energized electrode arms.

If the initial operating point is further removed from the cross-over state greater heating power is required to attain the cross-over state. If the heating power is very large the difference in temperature between the electrode arms will become large as well since only one arm is being energized. Accordingly, the velocity of light propagation in the corresponding waveguides below the energized and non-energized electrode arms is also different. In these circumstances the switch operates as an asymmetric directional coupler and cannot reach the first cross-over point.

If two pairs of lamillate electrode arms are arranged symmetrically relative to their common web (H-shaped electrode configuration) and if one electrode arm of one electrode arm pair is electrically energized simultaneously with the mirror-symmetrically disposed electrode arm of the other pair of electrode arms, opposing temperature gradients will be created in the two pairs of electrodes. Because of the thermo-optical effect these opposing temperature gradients cause the velocities of light propagation in those waveguide sections arranged mirror symmetrically relative to their common web below the electrode arms to be different by alternating values of $\Delta\beta$. Energization may be accomplished by only one source. In that case the same power is fed to the mirror-symmetrically energized electrode arms by current flowing through one electrode arm as well as through the other mirror-symmetrically disposed electrode arm. Energization is also possible from two sources which may feed different levels of power to the corresponding electrode arms. In the first-mentioned situation the $\Delta\beta$ realized in the sections of the thermo-optical switch is identical. If two sources are used the values of $\Delta\beta$ in the two section may be set separately and, hence, at different levels. The desired switching action of the thermo-optical switch in accordance with the invention may be further supplemented by the embodiment just described.

This effect is even more advantageous if the width of two waveguides which extend closely adjacent each other over their interactive length is at least partially covered by two pairs of lamellate electrode arms which in each pair are connected to each other by a common web, the two webs being thermally and electrically insulated from each other and arranged in symmetry to each other (double-U-shaped electrode configuration), since heat exchange is then restricted to one electrode pair and is not interacting. In such an arrangement, the webs may be disposed in the same plane either facing each other, or they may be rotated by 180°.

Other embodiments which are either independent of each other or which may be combined relate to further means for setting the thermal and/or geometric symmetry/asymmetry of the refractive indices in the two waveguides which extend closely adjacent each other, and relate to a flexible structuring of the electrode arms and waveguides.

Thus, these means are
electrode arms of different widths;
electrode arms of different thicknesses;
electrode arms made from different materials;
waveguides of different refractive indices;
waveguides of different widths.

It is possible by way of the variable placement of the two waveguides in the thermo-optical switch, i.e. the coupling coefficient is not constant in the range of the two closely adjacent waveguides, to reduce the wavelength dependency of the operating point and thus to increase the broadband state of the switch in accordance with the invention. Waveguides of many different shapes may be selected, for instance, two straight guides at a predetermined angle, a straight and a curved waveguide, or two curved waveguides.

In another embodiment there is provided on a substrate (S) a lower buffer layer (uP), a polymer waveguide (WL1 and WL2) containing layer (W) thereon and an upper buffer layer (oP) thereon with the heating electrode (E) being arranged in a manner to cover the polymer waveguides (WL1 and WL2).

In advantageous embodiments thereof
the refractive index of the lower buffer layer is only insignificantly lower than the refractive index of the waveguides and the difference between the refractive indices is about 0.005;
the lower buffer layer consists of two partial layers, the layer adjacent the substrate being of a much lower index of refraction than the waveguides;
the difference between the refractive indices between the waveguides and the upper buffer layer is about 0.2.

The last-mentioned embodiment with its advantageous features, i.e. a thermo-optical switch made of polymer, makes use of the mentioned and acclaimed possibilities derived from the polymer used as waveguide material;

Owing to the variability of the geometric, material-specific and electrical parameters of the heating electrode and of the waveguides and different possibilities of energizing the heating electrode, it is possible, in accordance with the invention to affect the symmetry/asymmetry of the TO directional coupler switch in a particular way to provide the parameters necessary for the switch to function as a symmetric or asymmetric one.

It has been found to be particularly advantageous subsequently to change the parameters of the switch, i.e. after its fabrication, by energizing the two electrode arms, or one electrode arm only, in a particular manner in order to conform them to desired operating conditions.

The symmetric and asymmetric properties, as the case may be, of the switch in accordance with the invention may be attained in a simple manner by changing the electrical resistance of the electrode arms over their widths or thickness, or by their material.

In order to reduce the fiber-chip coupling losses in polymeric thermo-optical switches the refractive index of the lower buffer layer is only slightly lower than the refractive index of the waveguide, and the difference between the two refractive indices is about 0.005. Since the difference between the two refractive indices is so small the lower buffer layer must be very thick for operating the switch at large wavelengths. For that reason, the lower buffer layer is made up of two partial layers, with the partial layer adjacent to the substrate having a much smaller refractive index than the waveguide layer. In order further to reduce the switching power, the upper buffer layer should be structured as thin as possible. For that reason, a further embodiment of the invention—which has already been mentioned—provides for a difference between the refractive indices between the waveguide layer and the upper buffer layer of about 0.2.

The thermo-optical switch in accordance with the invention is characterized by extremely low polarization independent cross-talk as well as low power consumption. Its function mode and compactness are such as to render the switch suitable as a basic element in large switching matrices. The fact that desired parameters of individual switching elements in a matrix may subsequently be individually set by way of different levels of energinzation of the electrode arms is particularly advantageous.

Further characteristics and useful structures of the embodiment will be apparent from the following embodiments which will be explained in detail with reference to the drawings, in which:

DESCRIPTION OF THE SEVERAL DRAWINGS

Figure 2:
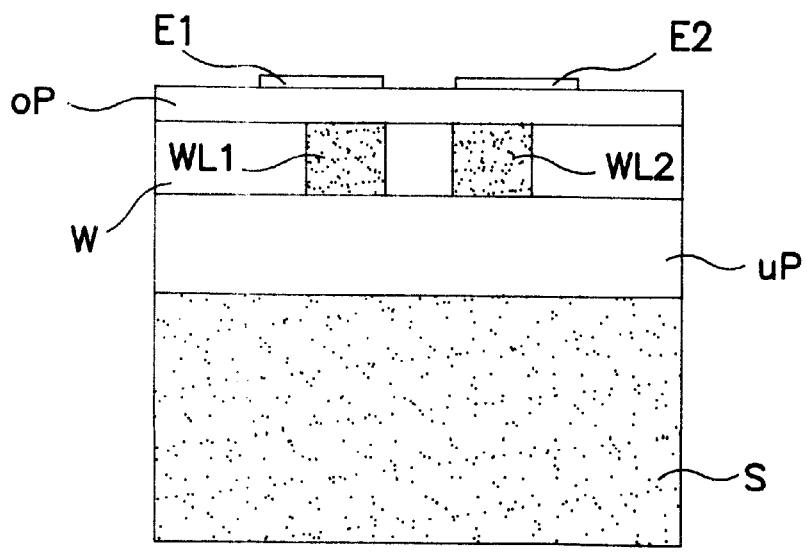
FIG. 2 is a cross-section along line A—A of the multiple layer structure shown in FIG. 1.
Figure 3:
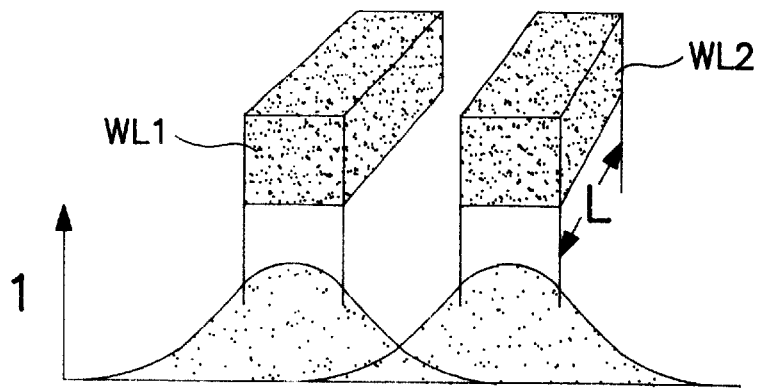
Figure 4:
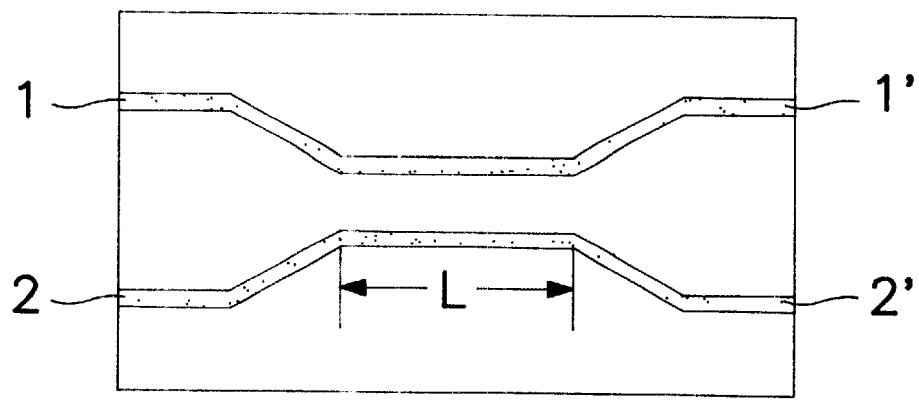
Figure 5:
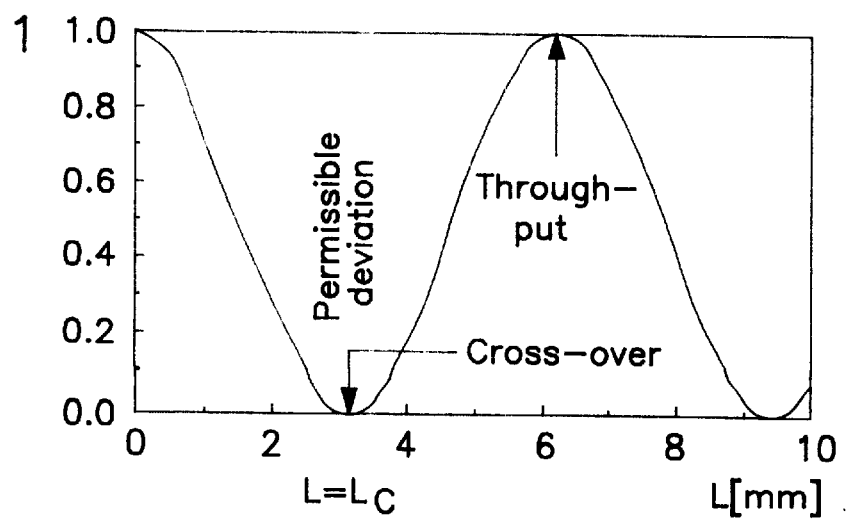
Figure 6A:
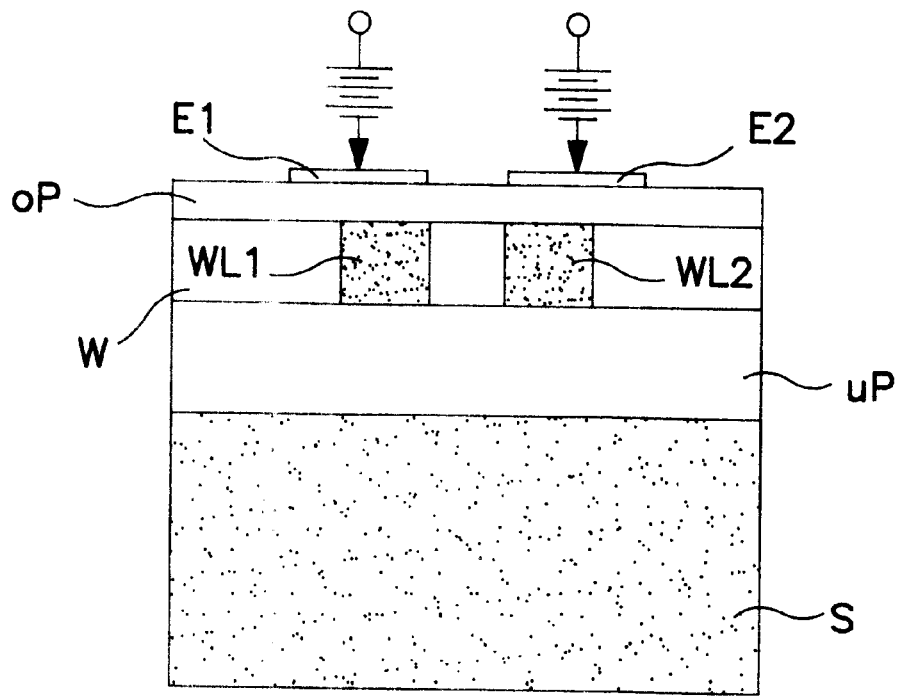
Figure 7A:
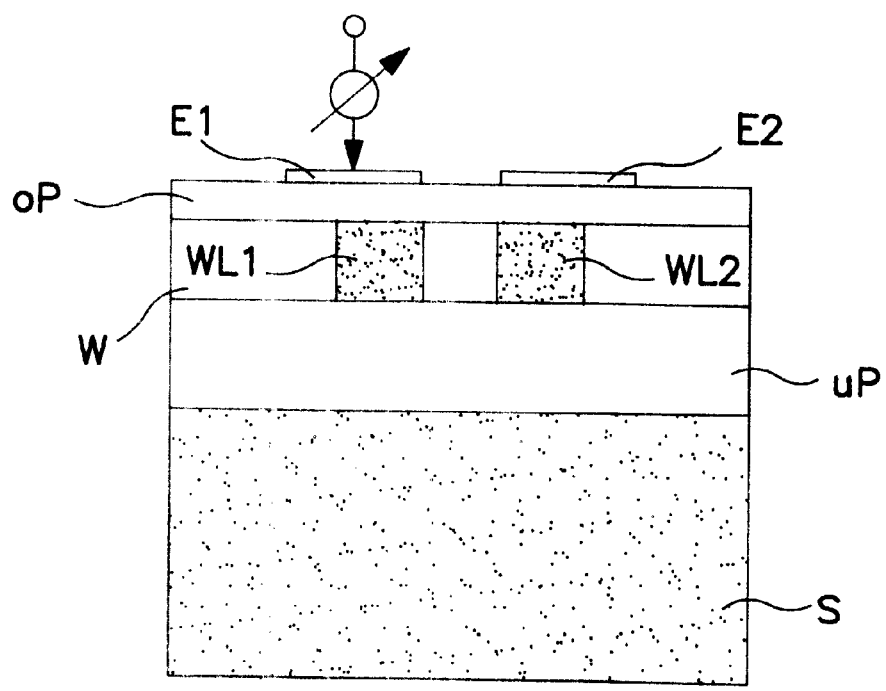
Figure 7B:
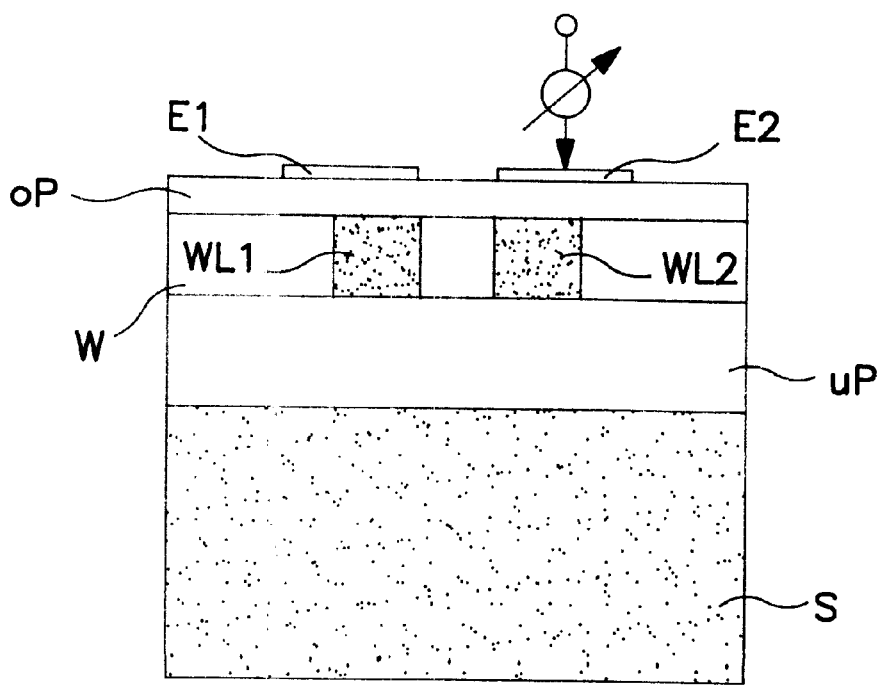
Figure 8:
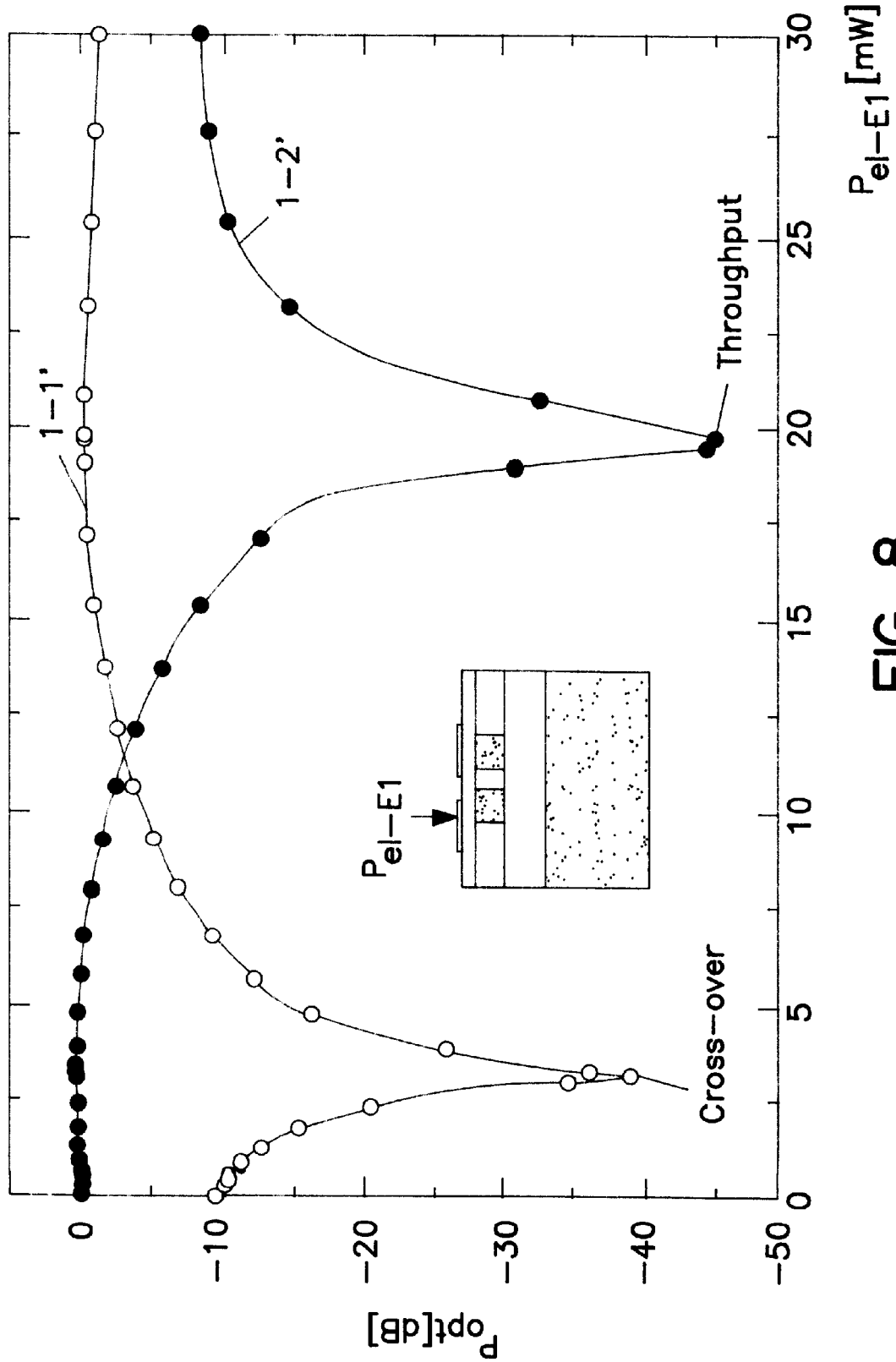
Figure 9:
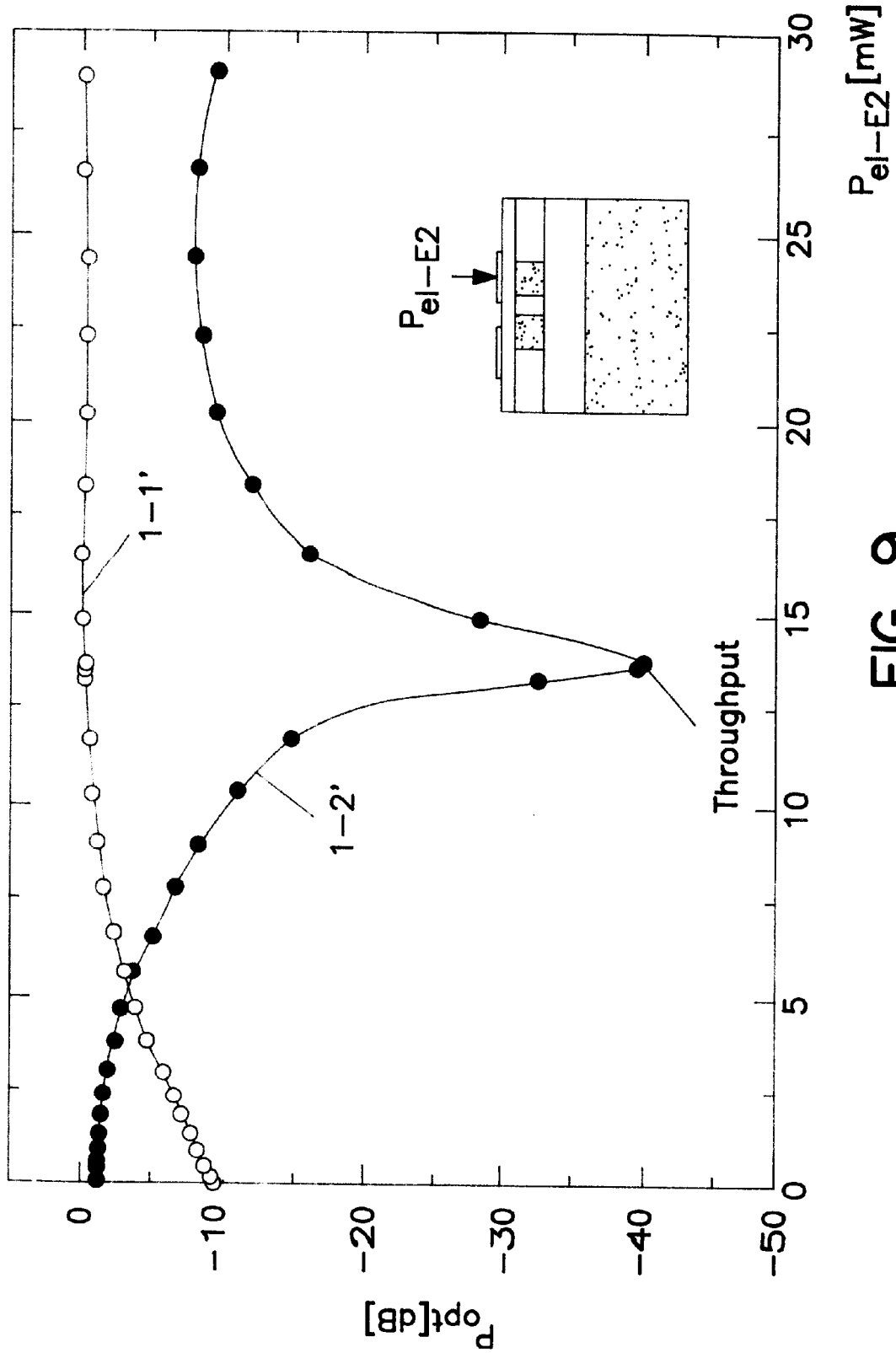
Figure 10:
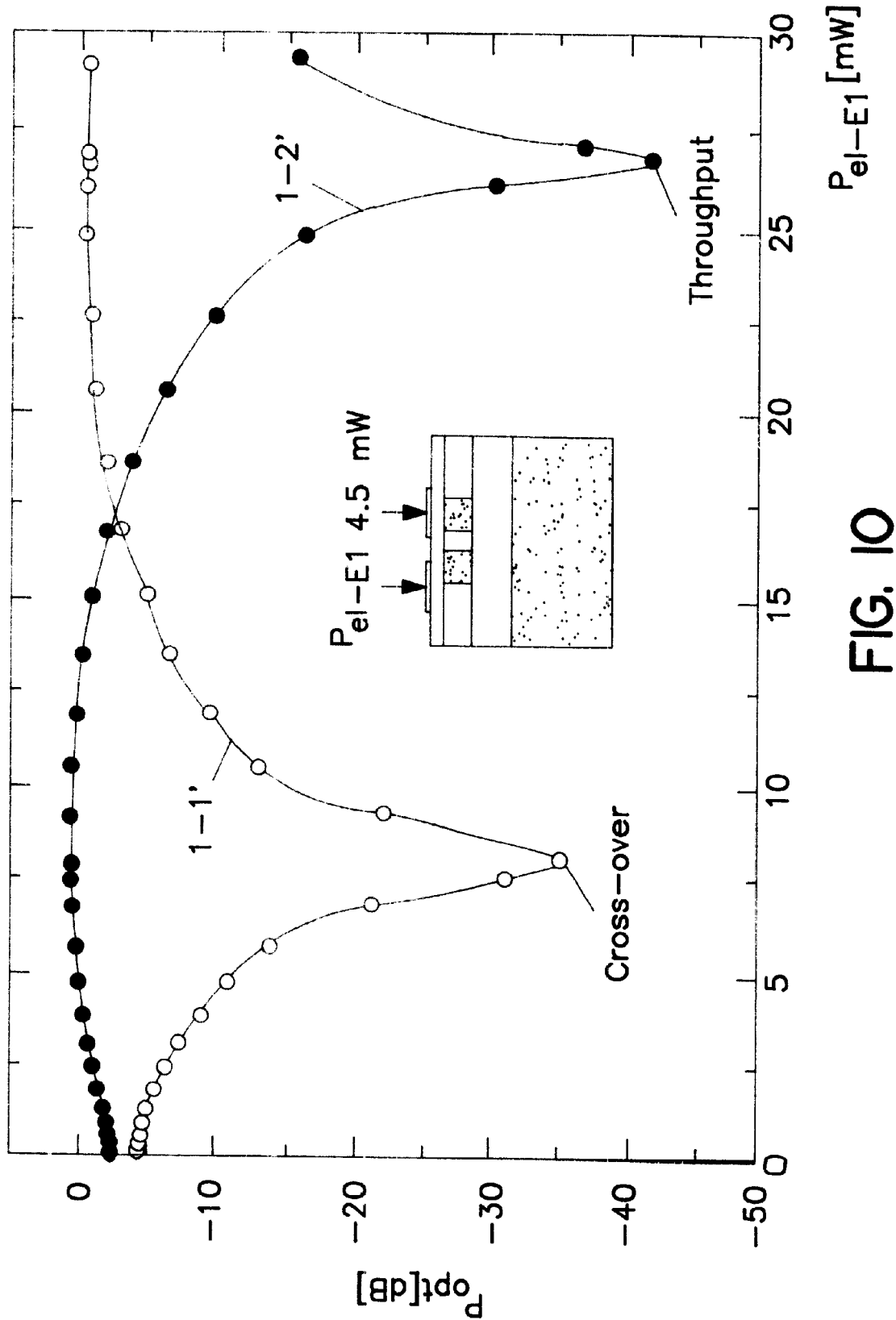
Figure 11:
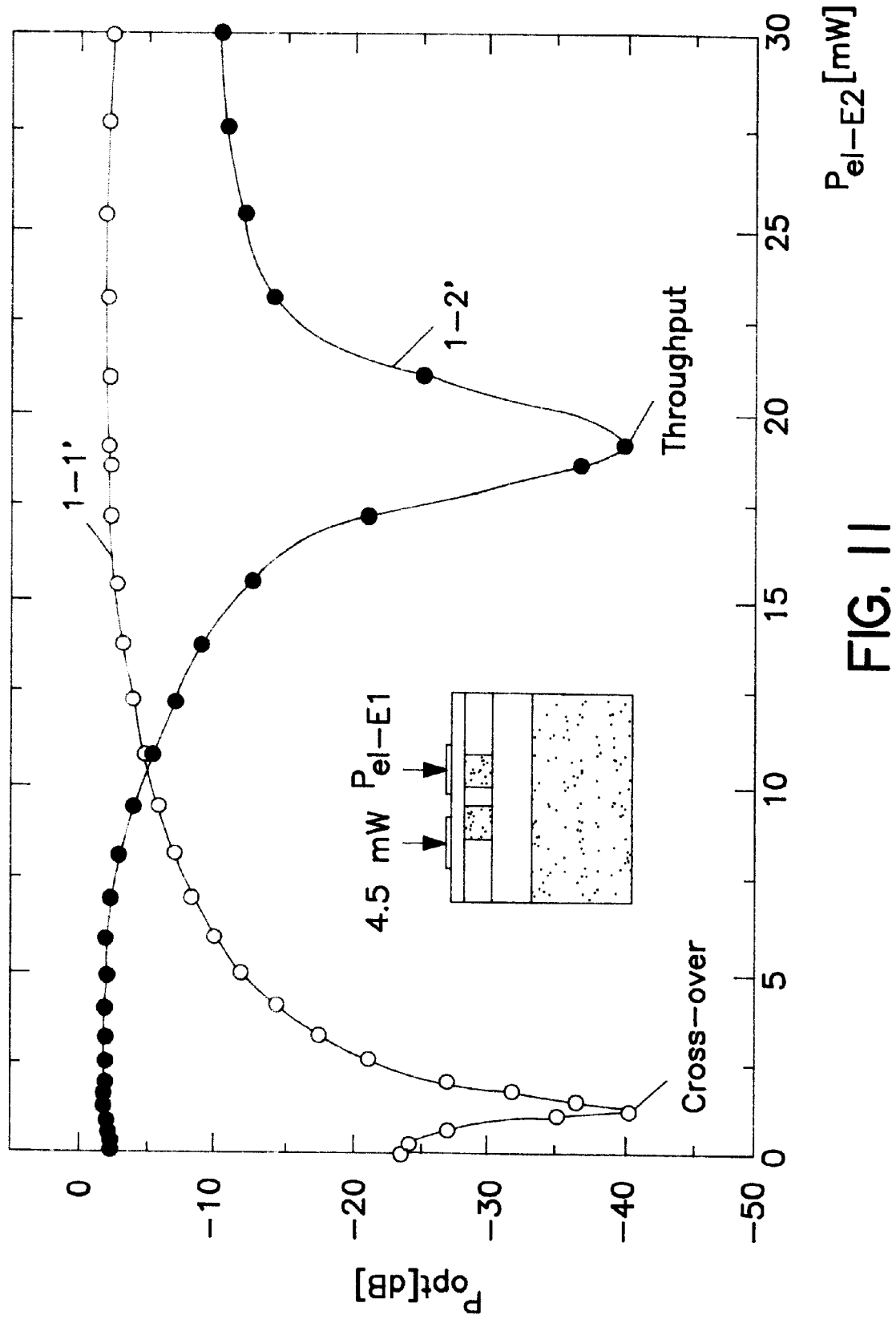
Figure 12:
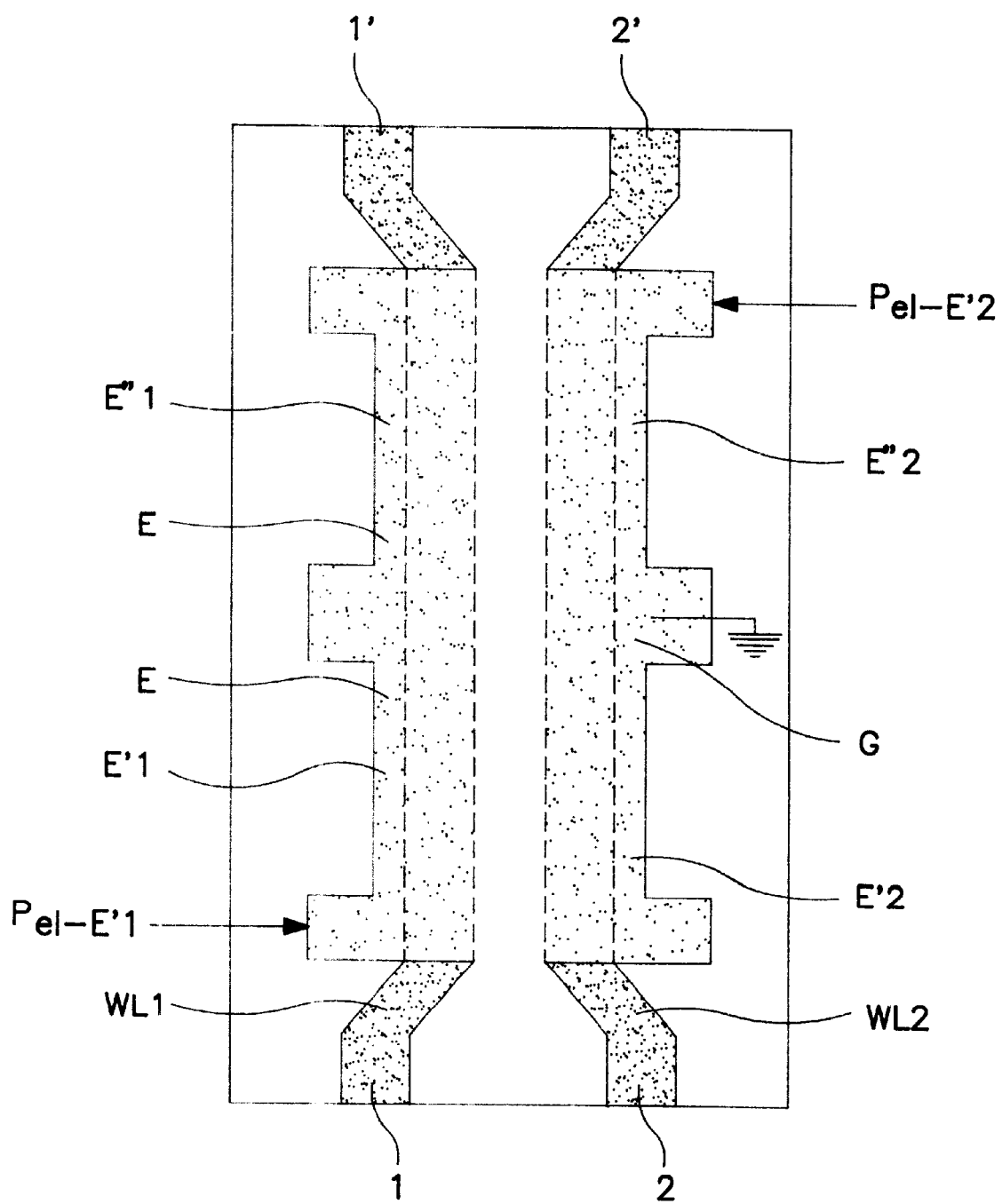
Figure 13:
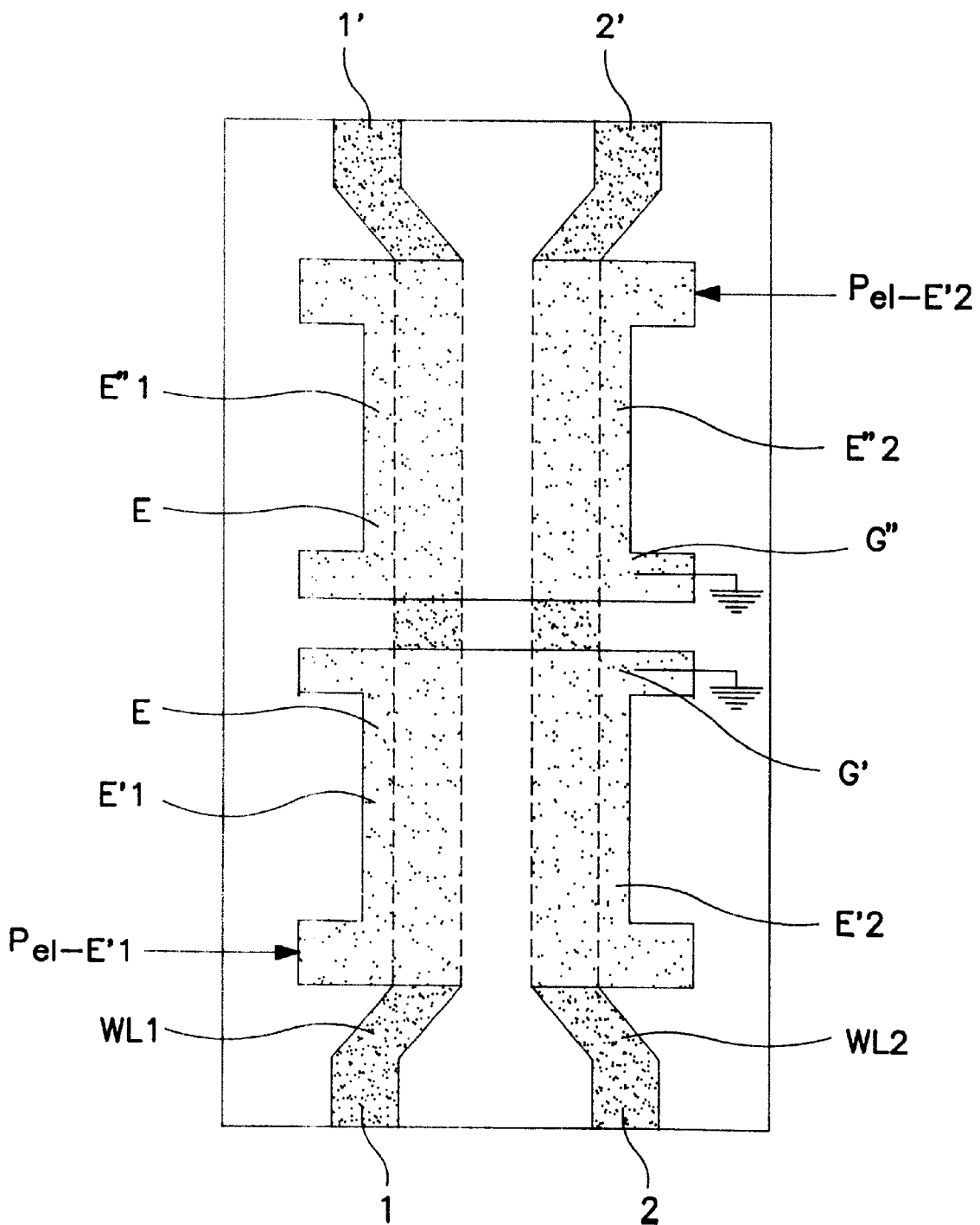

FIG. 3 schematically depicts the coupling of the light propagating in waveguides WL1 and WL2;

FIG. 4 schematically depicts a parallel arrangement of the waveguides WL1 and WL2 along their interactive lengths L;

FIG. 5 depicts the dependency of light coupling from the interactive length L of both parallel waveguides WL1 and WL2;

FIGS. 6a & b schematically depicts a cross-section corresponding to FIG. 2 having electrode arms E1 and E2 arranged congruently with respect to the inner margins of the waveguides WL1 and WL2 at symmetrical and asymmetrical energization of the electrode arms E1 and E2, respectively;

FIGS. 7a & b schematically depicts a cross-section corresponding to FIG. 2 with the inner margin of the electrode arms E1 and E2 displaced relative to the inner margins of the waveguides WL1 and WL2 with electrode arm E1 and E2, respectively being energized;

FIG. 8 depicts the switching action of a polymer based switch in accordance with the invention structured and energized as shown in FIG. 7a;

FIG. 9 depicts the switching action of a polymer based switch in accordance with the invention structure and energized as shown in FIG. 7b;

FIG. 10 depicts the switching action of a polymer based switch in accordance with the invention with inner margins of electrode arms E1 and E2 being displaced relative to inner margins of waveguides WL1 and WL2 with simultaneous energization of both electrode arms, the switching power at electrode arm E2 being constant;

FIG. 11 is similar to FIG. 10 but with the switching power at electrode arms E1 being constant;

FIG. 12 is a schematic presentation in top elevation of the layer structure of the polymer-based switch in accordance with the invention having two pairs of lamellate electrode arms (E'1, E'2 and E"1 and E"2) arranged symmetrically on a common web (G);

FIG. 13 is a schematic presentation according to FIG. 12 but with a divided and electrically and thermally insulated web with a web portion G' and a web portion G".

DETAILED DESCRIPTION OF PREFERRED EMBODIMENTS

Figure 1:
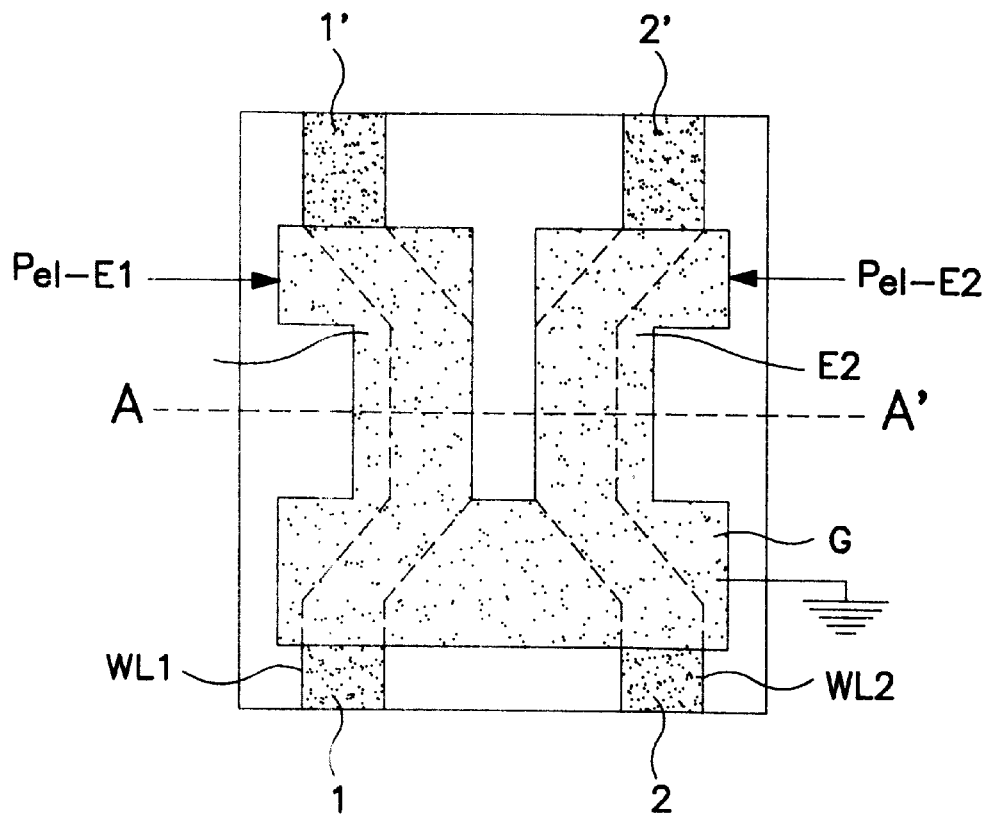
FIG. 1 is a schematic presentation in top elevation of a multiple layer structure of the polymer based switch in accordance with the invention, with a pair of lamellate electrode arms.

A symmetrically structured electrode E divided into two portions may be clearly seen in FIG. 1 as the uppermost layer of the polymer based thermo-optical switch in accordance with the invention. The two electrode arms E1 and E2 are disposed congruently over two parallel waveguides WL1 and WL2. At one end, the two electrode arms E1 and E2 are connected to each other by a web G (U-shaped electrode configuration), the common web G being here provided near two input gates 1 and 2 of the TOS. If the cross-section of the waveguide is designated as a $\mu m \times b$ $\mu m$, a in this embodiment $\leq 5$ $\mu m$ and $b \leq 10$ $\mu m$, the spacing between the waveguides WL1 and WL2 is about 0.5 a to 1.5 a, and the interactive length is several millimeters.

For purposes of schematic presentations and measuring curves to be determined under different operating conditions in the following figures, the switch is of the following dimensions: a=6.0 $\mu m$, b=5.0 $\mu m$; the spacing between the waveguides WL1 and WL2 measures 5.5 pm; the interactive length L=4.5 mm. The spacing between gates 1 and 2 and gates 1' and 2' of the two waveguides WL1 and WL2 measures 250 $\mu m$. The width of the two electrode arms E1 and E2 is at least as large as the width of the two waveguides WL1 and WL2. In the present example it is 15 $\mu m$. The overall length of the thermo-optical switch in accordance with the invention in this example is less than 10 mm.

In the cross-section AA' of the multiple layer structure of the switch in accordance with the invention shown in FIG. 2, a lower buffer layer uP made of $SiO_x$ and having a thickness of 6 $\mu m$ and a refractive index of 1.475 is arranged on a silicon substrate S having thickness of 400 $\mu m$ and a refractive index of n=3.5. On top of the buffer layer uP, there is provided the waveguide layer W consisting of 25% BDK; 75% PMMA and being of a thickness of 5 $\mu m$ and refractive index of 1.5 and containing the waveguides WL1 and WL2 of rectangular cross-section (5 $\mu m \times 6$ $\mu m$) and a refractive index of 1.505. The waveguide layer W is positioned adjacent to a further buffer layer oP made of Teflon® AF 1600 (d=2.5 $\mu m$, n=1.3) upon which the electrode arms E1 and E2 of a width of 15 $\mu m$ of the aluminum-gold multilayer electrode E is arranged congruently with respect to the two waveguides WL1 and WL2. The individual layers may be fabricated by state of the art processes. The substrate may also be selected from one of the following materials: glass, polymeric material, ceramic or metal. Preferably, a silicon plate is used as the substrate since silicon has a much higher thermal conductivity than polymers and therefore functions particularly well as a heat sink. Moreover, the end surface preparation is much simpler because of the use of easily controllable cutting and polishing processes. Si has a very high refractive index. For that reason the waveguide layer has to be optically separated from the Si substrate by a lower buffer layer uP. Aside from the above-mentioned $SiO_x$, glass or polymeric material may also be used as a material for this buffer layer. The latter has a much lower thermal conductivity than the other two mentioned materials and leads to a reduction in the switching power of the thermo-optical switch. After the buffer layer uP has dried, the waveguide layer W is deposited by spinning. The strip waveguides WL1 and WL2 may be fabricated by various processes. Wet and dry etching and photo-induced changes of the refractive index, such as photo bleaching and photo locking may be mentioned as examples. Aside from the already mentioned Teflon AF, the upper buffer layer oP may also be made of another polymer material or glass or $SiO_x$. In order to solve the task underlying the present invention—reduced power consumption—the upper buffer layer is structured as thin as possible and its refractive index is lower by about 0.2 than the refractive index of the waveguide layer W. This may be ensured by the selection of the layer materials. The process is terminated by vapor deposition of an aluminum-gold layer of a thickness of, 0.22 $\mu m$. The electrode E provided with two electrode arms E1 and E2 is etched out of the layer by a wet chemical process. The heat generated by electrical energization of the Al/Au electrode E diffuses through the upper buffer layer oP, the waveguide layer W and the lower buffer layer uP into the Si substrate S which also functions as a heat sink. The refractive index in the waveguide layer is lowered, and the propagation constant of the waveguides is thus changed, because of the negative temperature coefficient of the waveguide material ($dn/dT = -140 \times 10^{-6}/K$).

In FIG. 3 which depicts the intensity distribution I of the light propagating in waveguides WL1 and WL2 normal to the direction of propagation it can be seen that a coupling region is formed over the interactive length L between the two waveguides WL1 and WL2. The coupling region may be varied by changing the refractive indices (by energizing the heating electrode and resulting temperature change in and, therefore, change of refractive index of, the waveguides). Cross and throughput states may thus be set depending upon the coupling range.

FIG. 4 depicts the arrangement of the waveguides WL1 and WL2 with corresponding input and output gates 1 and 2 and 1' and 2', respectively. Light propagating in the waveguides is coupled in and out within the interactive length L in which the two waveguides WL1 and WL2 are placed in parallel and closely adjacent each other.

The dependence of light overcoupling upon the interactive length L of the switch at fixed waveguide form and dimension and fixed spacing between the waveguides WL1 and WL2 is shown in FIG. 5. It may be clearly seen from the drawing, that the deviation from the interactive length L which at the cross-over point equals the coupling length $L_c$, may be varied by up to 25% towards greater lengths so that the switch in accordance with the invention functions as a symmetric switch, i.e. the first cross-over point may be switched also. This permissible deviation within the desired symmetric function is advantageous as regards the fabrication of the switch in accordance with the invention.

Figure 6B:
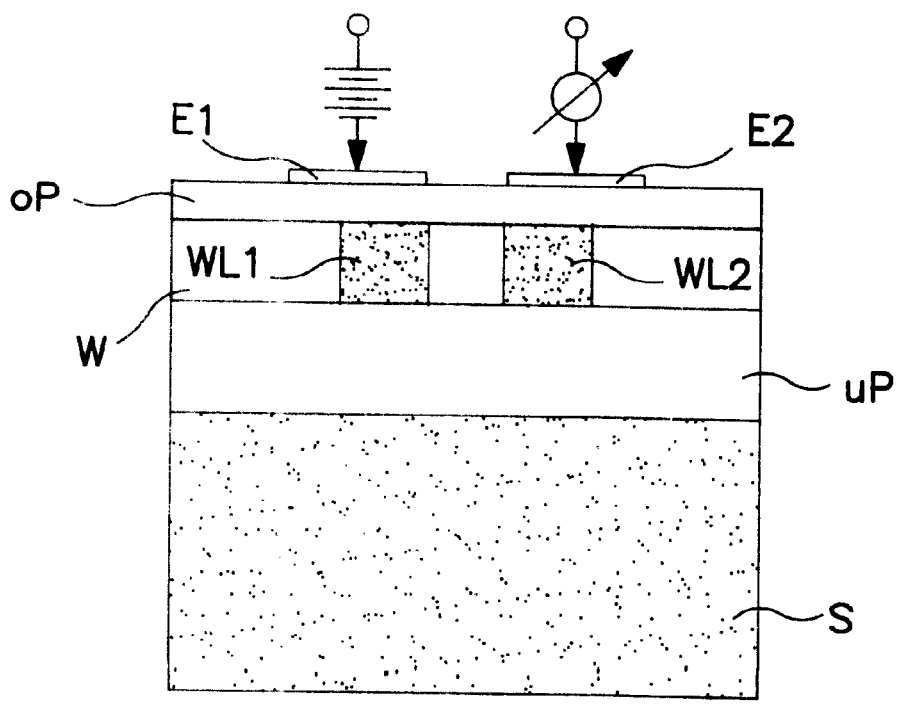

FIGS. 6a and 6b are cross-sectional views, similar to FIG. 2, of a polymer-based switch in accordance with the invention. In both structures, the inner margins of the electrode arms E1 and E2 are arranged congruently relative to the inner margins of the waveguide arms WL1 and WL2 positioned below them. If, as shown in FIG. 6a, both electrode arms E1 and E2 are initially simultaneously energized with the same power, the switch will function as a symmetric coupler with identical propagation constants of the light in the waveguides WL1 and WL2, and it will switch into the cross-over state. Once cross-over state has been reached, the switching power at the electrode arm E2 will be further increased while at the same time the switching power at the electrode arm E1 will remain constant. The temperature difference between the two electrode arms E1 and E2 is thus increased. The switch will, therefore, function as an asymmetric coupler and changes over to its throughput state.

FIGS. 7a and 7b again depict a cross-section of a polymer-based switch in accordance with the invention, similar to FIG. 2. In this presentation, the inner margins of the electrode arms E1 and E2 are displaced relative to the inner margins of the waveguides WL1 and WL2 positioned below them, and only one electrode arm E1 (in FIG. 7a) or E2 (in FIG. 7b) is energized. Owing to the good thermal conductivity of the heating electrode E the temperature of both electrode arms E1 and E2 will be approximately equal when a low switching power is initially applied.

The geometric asymmetry of the electrode arms E1 and E2 relative to the optical axis of the switch results in a more favorable heat transfer from electrode arm E2 to the underlying waveguide WL2 than from E1 to WL1. In this manner, an almost symmetrical effect is obtained in respect of the two waveguides WL1 and WL2 so that at low switching power the propagation constants of light in WL1 and WL2 are about equal and the switch functions as a symmetric coupler and changes over to its cross-over state. If the switching power at the electrode arm E1 is increased the difference between the temperatures of the two electrode arms E1 and E2 will also increase. The asymmetric switching effect will now dominate and the coupler will change over to its throughput state. If the electrode arm E2 is energized it will have a significantly higher temperature than the electrode arm E1. Because of this temperature difference and the geometric asymmetry of the two electrode arms E1 and E2 the switch can only function as an asymmetric coupler and change over to its throughput state. In this arrangement, the cross-over state cannot be attained.

The switching behavior of the switch in accordance with the invention in which the inner margins of the electrode arms E1 and E2 are displaced relative to the inner margins of the waveguides WL1 and WL2—as shown in FIGS. 7a and 7b—differs depending upon the position where the heat is generated (in E1 or E2, or simultaneously in E1 and E2). To demonstrate the switching behavior of the switch in accordance with the invention light of wavelength of $\lambda=1.55$ $\mu$m was coupled from a laser diode into the input 1 of waveguide WL1 or into input 2 of waveguide WL2, and the optical output power as a function of the heating power of the corresponding electrode arm was measured for TE and TM polarization at the output 1' of the waveguide WL1 (throughput) or at output 2' of waveguide WL2 (cross-over state). Since only a very small dependency upon the polarization of the lightwave could be detected in all switching states (typically <0.5 dB), only the switching curves for TM polarization are being shown in the following figures.

FIG. 8 depicts the switching behavior of the thermo-optical switch in accordance with the invention with electrode arms E1 and E2 being displaced relative to waveguides WL1 and WL2 when only electrode arm E1 is energized (according to FIG. 7a, see also the inserted image). When in a powerless state the switch, at a point slightly above the cross-over state, will be at an extinction ratio of ~10 dB. If the electrode arm E1 is energized, the switch will first change to a cross-over state reaching an extinction ratio of −42 dB at 3.1 mW for TM polarization. Cross-talk of <−30 dB can be ensured within an interval of ±13% around this operating point. If the heating power at electrode arm E2 is increased the switch will change to state with a throughput extinction ratio −45 dB at 10.7 mW. In order again to ensured cross-talk of <−30 dB in this switching state the heating power may deviate by about ±5% in respect of the actual operating point. Switching time is less than 1 ms.

FIG. 9 depicts the switching behavior of a switch having the displaced arrangement of the electrode arms E1 and E2 relative to the two waveguides WL1 and WL2 shown in FIG. 7b and the inserted image, with only electrode arm E2 being energized. As may be seen in FIG. 9, such an arrangement does not reach the cross-over point and cannot be operated as a symmetric switch. The power needed for this switch to change over to the throughput state is about 14 mW. In this arrangement of the electrode arms relative to the waveguides and the energization of electrode arm E2, the effect of the asymmetric arrangement of the electrode arms E1 and E2 relative to the waveguides WL1 and WL2 dominates, as may be expected.

If both electrode arms E1 and E2 are heated, the switching action depicted in FIG. 10 will ensue with a switch structured as shown in the inserted image: The electrode arm E2 is energized with a constant power $P_{E2}$ of 4.5 mW, and at the same time the heating power $E_{E1}$ of electrode arm E1 is increased for measuring the switching behavior. In this manner it was found that the effect of the power energizing the electrode arm E2 has to be compensated by applying an qual power to the electrode arm E1 in order to reach the cross-over point. The energization of both electrode arms thus requires greater heating power.

FIG. 11 depicts the switching state of energizing the electrode arm E2—as depicted in the inserted image—at a constant power $P_{E2}=4.5$ mW while increasing the heating power $P_{E1}$ of the electrode arm E1 at the same time. By comparison with FIG. 9 it may be seen that when energizing the electrode arm E2 with only low heating power $P_{E2}$ the switch structured as shown in FIGS. 7a, b will change to the cross-over state since the electrode arm E2 is already pre-heated. If the heating power at the electrode arm E2 is increased the switch will quickly reach its throughput state because of the effective additional geometric asymmetry. The effect of pre-heating the electrode arm E1 is equivalent to canceling the geometric asymmetry of the position of the electrode arms E1 and E2 with respect to the waveguides WL1 and WL2. Flexible structuring and fabrication of the thermo-optical switch in accordance with the invention is possible by knowledge of the switching behavior in different—but simultaneous—states of energization of the electrode arms E1 and E2.

FIG. 12 is a schematic top elevation of a polymer-based thermo-optical switch in accordance with the invention in which a pair of lamellate electrode arms E'1, E'2 and E"1, E"2 are arranged symmetrically relative to a common web G (H-shaped electrode configuration). In such an arrangement a Δβ directional coupler may be realized by the simultaneous electric energization of one electrode arm of an electrode arm pair with the mirror-symmetrically arranged electrode arm of the other pair of electrode arms, i.e. E'1 and E"2 or E'2 and E"1. This leads to the creation of a temperature gradient in the two arms of each of the electrode arm pairs E'1 and E'2 or E"1 and E"2, the gradient in one pair being opposite the gradient in the other pair. Because of the thermo-optical effect different propagation velocities of the light may be set by the two arms E"1 and E'2 or E"1 and E"2 of an electrode pair in the sections of the waveguides WL1 and WL2 positioned below the electrodes. The differences may be of equal value but opposite signs or, if two energizing sources are used, the Δβ may be different.

This embodiment makes it possible to enlarge the permissible deviations of the interactive length L depicted in FIG. 5, in its dimension toward greater interactive lengths as well as to smaller—but equal in terms of value—interactive lengths. Within the enlarged range of the wavelength L about point L=$L_c$, where $L_c$ is the coupling length at the cross-over point, the switch functions as a symmetric switch and may change over into the first cross-over point. It may also be seen in FIG. 5 that where the interactive length L differs from the coupling length $L_c$, cross-talk deteriorates. The embodiment shown in FIG. 12 and FIG. 13 makes it possible and ensures precise setting of cross-talk like a precisely matched value L=$L_c$ by combining the directional coupler arrangement having an alternating Δβ with the described variants for creating a geometric or material-specific asymmetry of the switch in accordance with the invention relative to its optical axis.

The advantages already mentioned are also obtained in FIG. 13, which in contrast to FIG. 12, depicts separate pairs of lamellate electrode arms with the arms of each pair being connected by a common web. The two electrode arms E'1 and E'2 of one of the electrode pairs are connected to each other by the web G' and the two electrode arms E"1 and E"2 of the other electrode arm pair are connected to each other by the web G" (double-U-shaped electrode configuration). The effect of the switch described in FIG. 12 is still further enhanced because heat exchange between electrode arms E'1 and E'2 or E"1 and E"2 of an electrode pair is improved and restricted to the arms of an electrode arm pair and interaction with the other electrode arm pair is substantially reduced because of the insulation of the two webs G' and G".

What is claimed is:

1. A thermo-optical switch, comprising:
   a substrate;
   a waveguide layer supported by the substrate;
   first and second waveguides in the wave guide layer, the waveguides being of predetermined width and refractive indices of a predetermined state of at least one of thermal and geometric symmetry and having interactive sections of predetermined length extending closely adjacent to each other;
   at least one heating electrode comprising first and second interconnected lamellate arms respectively disposed in superposition over the length and at least part of the width of the interactive sections of the first and second waveguides, the first and second arms being of a configuration substantially similar to the first and second waveguides and provided with free ends extending in the same direction;
   means for electrically energizing at least one of the electrode arms thereby to adjust the state of symmetry of the refractive indices.

2. The thermo-optical switch of claim 1, wherein the heating electrode comprises first and second arms connected to each other intermediate their ends.

3. The thermo-optical switch of claim 1, comprising first and second heating electrodes each comprising first and second interconnected lamellate arms, the first and second lamellate arms of the first heating electrode extending in a direction opposite the first and second arms of the second heating electrode.

4. The thermo-optical switch of claim 1, wherein one of the first and second arms is displaced laterally relative to the waveguide disposed therebelow.

5. The thermo-optical switch of claim 1, wherein the waveguides and the electrode arms each have margins facing each other and wherein the facing margins of the waveguides and the facing margins of the electrode arms are disposed congruently.

6. The thermo-optical switch of claim 1, wherein the interactive sections of the waveguides are disposed in parallel relative to each other.

7. The thermo-optical switch of claim 1, wherein the heating electrode comprises first and second arms disposed in parallel to each other and interconnected at their middle thereby to form two partial arms each and energization of a partial arm causes simultaneous energization of a partial arm disposed symmetrically thereto.

8. The thermo-optical switch of claim 1, wherein the predetermined state of symmetry of the refractive indices includes selectively subjecting one of the electrode arms to a constant biasing voltage.

9. The thermo-optical switch of claim 1, wherein the state of symmetry of the refractive indices is adjusted by electrode arms of different widths.

10. The thermo-optical switch of claim 1, wherein the state of symmetry of the refractive indices is adjusted by electrode arms of different thickness.

11. The thermo-optical switch of claim 1, wherein the state of symmetry of the refractive indices is adjusted by electrode arms made of different materials.

12. The thermo-optical switch of claim 1, wherein the state of symmetry of the refractive indices is determined by waveguides of different refractive indices.

13. The thermo-optical switch of claim 1, wherein the state of symmetry of the refractive indices is determined by waveguides of different widths.

14. The thermo-optical switch of claim 1, wherein the refractive indices of the first and second waveguides are symmetrical.

15. The thermo-optical switch of claim 1, wherein the refractive indices of the first and second waveguides are asymmetrical.

16. The thermo-optical switch of claim 1, further comprising a first buffer layer intermediate the substrate and the waveguide layer.

17. The thermo-optical switch of claim 16, further comprising a second buffer layer covering the waveguide layer.

18. The thermo-optical switch of claim 17, wherein the heating electrode is disposed on the second buffer layer.

19. The thermo-optical switch of claim 17, wherein the difference between the refractive index of the waveguides and the second buffer layer is about 0.2.

20. The thermo-optical switch of claim 16, wherein the first buffer layer comprises two layers, the layer adjacent to the substrate having a lower index of refraction than the waveguides.

* * * * *